(12) United States Patent  
Ceccarelli et al.

(10) Patent No.: US 9,722,696 B2
(45) Date of Patent: Aug. 1, 2017

(54) MONITORING OF COMMUNICATIONS NETWORK AT PACKET AND OPTICAL LAYERS

(71) Applicant: Telefonaktiebolaget L M Ericsson (publ), Stockholm (SE)

(72) Inventors: Daniele Ceccarelli, Stockholm (SE); Giulio Bottari, Pisa (IT); Diego Caviglia, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 65 days.

(21) Appl. No.: 14/762,314

(22) PCT Filed: Feb. 15, 2013

(86) PCT No.: PCT/EP2013/053141
§ 371 (c)(1),
(2) Date: Jul. 21, 2015

(87) PCT Pub. No.: WO2014/124694
PCT Pub. Date: Aug. 21, 2014

(65) Prior Publication Data
US 2016/0013861 A1 Jan. 14, 2016

(51) Int. Cl.
*H04B 10/079* (2013.01)
*H04L 12/26* (2006.01)
(Continued)

(52) U.S. Cl.
CPC ........ *H04B 10/0795* (2013.01); *H04J 14/021* (2013.01); *H04J 14/0258* (2013.01);
(Continued)

(58) Field of Classification Search
CPC ... H04L 1/0009; H04L 1/0002; H04L 1/0003; H04B 10/0795; H04J 14/021
(Continued)

(56) References Cited

U.S. PATENT DOCUMENTS 6,091,947 A * 7/2000 Sumner .................. H04W 4/12
455/413
2007/0280265 A1 12/2007 Gerstel
(Continued)

OTHER PUBLICATIONS

PCT International Search Report, mailed Jun. 18, 2013, in connection with International Application No. PCT/EP2013/053141, all pages.
(Continued)

*Primary Examiner* — Don N Vo
(74) *Attorney, Agent, or Firm* — Leffler Intellectual Property Law, PLLC

(57) ABSTRACT

A method of monitoring a communications network by monitoring packet errors in one of the paths having at least two optical sections coupled in series with a break in continuity of optical transmission monitoring between the optical sections, and monitoring a transmission quality of each of these optical sections. A state is detected in which the monitored packet errors do exceed an acceptable threshold, but at the same time the transmission quality of each of the optical sections is acceptable, and an indication is transmitted of the detection. This can cause a request for an alternative path for the packets, or cause adapting of these optical sections to reduce bit errors. This can enable handling of potential conflict between packet and optical layers, when the packet layer sees errors but the optical layer indicates no problem.

17 Claims, 7 Drawing Sheets

(51) Int. Cl.
  *H04L 12/24* (2006.01)
  *H04J 14/02* (2006.01)
  *H04Q 11/00* (2006.01)
(52) U.S. Cl.
  CPC ...... *H04J 14/0268* (2013.01); *H04L 41/0659* (2013.01); *H04L 43/0847* (2013.01); *H04Q 11/0066* (2013.01)
(58) Field of Classification Search
  USPC .......................................................... 398/25
  See application file for complete search history.

(56) References Cited

U.S. PATENT DOCUMENTS

| | | | |
|---|---|---|---|
| 2010/0157813 | A1 | 6/2010 | Matsuura |
| 2012/0230671 | A1 | 9/2012 | Nakada et al. |
| 2013/0308471 | A1* | 11/2013 | Krzanowski ........ H04L 43/0811 370/252 |
| 2015/0189567 | A1* | 7/2015 | Srivastava ............ H04W 36/30 370/332 |

OTHER PUBLICATIONS

Caroline P Lai et al, Cross-layer proactive packet protection switching, IEEE/OSA Journal of Optical Communications and Networking, vol. 4, No. 10, Oct. 1, 2012, pp. 847-857.
Giulio Bottari et al, OTN Pit-Stop in Wavelength Switched Optical Networks, OFC/NFOEC Technical Digest, 2012, 3 pages.
Bit Error Rate, 5 pages.
Joao Paulo Madaleno et al, End-to-End Packet Errors Probability in IP Over WDM Networks, 4 pages.

\* cited by examiner

MONITORING OF COMMUNICATIONS NETWORK AT PACKET AND OPTICAL LAYERS

FIELD

The present invention relates to methods of monitoring a communications network, to apparatus for monitoring, to apparatus for adapting such networks and to corresponding computer programs.

BACKGROUND

The packet over optical network scenario is one that is becoming more common in the current communication panorama. Traditionally, the performances at the two layers are measured using the following parameters:

Packet Layer. The Packet Error Rate (PER) is the number of incorrectly received data packets divided by the total number of received packets during a studied time interval.

Optical Layer. The Bit Error Rate (BER) is the number of bit errors divided by the total number of transferred bits during a studied time interval.

There are many known ways of measuring these and many ways of managing the different layers to remedy the situation if the error rate is not acceptable.

SUMMARY

Embodiments of the invention provide improved methods and apparatus. According to a first aspect of the invention, there is provided a method of monitoring a communications network having paths for sending packets, and having steps of monitoring packet errors in one of the paths having at least two optical sections coupled in series with a break in continuity of optical transmission monitoring between the optical sections, and monitoring a transmission quality of each of these optical sections. A state is detected in which the monitored packet errors do exceed an acceptable threshold, but at the same time the transmission quality of each of the optical sections is acceptable. A signal indicative of the detection of this state is output.

Such detection of this state can be important for various reasons, and can be useful to indicate to an operator, or to a client, or to enable various remedial actions. See FIG. 2 for example. At the same time this can reduce the risk of a potential conflict between packet and optical layers, when the packet layer sees errors but the optical layer is indicating that all is OK. Sections coupled in series can encompass nested paths, as may occur where optical networks of different operators are used for example.

Any additional features can be added or can be disclaimed and some are described in more detail below. One such additional feature is where the signal is used to cause a request for an alternative path for the packets. This is usually quicker and lower cost than optical layer adaptation, so is worth trying first, so that there is less delay to packets while the optical layer is adapted, see FIG. 3 for example.

Another additional feature is the step of requesting comprises indicating that the alternative path is to use different optical sections. A benefit of this is that this packet layer request is no longer "blind" to the cause of the excessive PER, so is more likely to find a different route which is good enough. Typically this can be found much more quickly at the packet layer than any adaptation of the optical layer. The optical layer can still be adapted to reduce the cumulative BER, but without delaying traffic. If the packet layer rerouting is unsuccessful then optical layer adaptation can be carried out to reduce the cumulative BER, though the traffic is delayed in this case. See FIG. 8 for example.

Another such additional feature is the monitoring of transmission quality comprising monitoring bit errors. See FIG. 4 or 8 for example. Another such additional feature is the signal being used for the step of causing adapting of at least one of these optical sections to reduce bit errors. This can enable the total accumulated bit errors to be reduced, to enable the packet errors to be reduced.

Another aspect provides a method of adapting optical sections of a communications network of paths for sending packets, by receiving a signal relating to one of the paths having at least two of the optical sections coupled in series with a break in continuity of optical transmission monitoring between the optical sections. The signal indicates a detection of a state in which monitored packet errors exceed an acceptable threshold, but at the same time respective optical section transmission qualities monitored for the optical sections are acceptable. Then these optical sections are adapted to improve their transmission qualities.

Another such additional feature is the adapting comprises altering a wavelength allocation of an optical path to reduce cross talk with optical paths having adjacent wavelengths. This is one possible source of bit errors and can encompass choosing a different optical wavelength for the current optical path, or choosing different wavelengths for other optical paths on neighbouring wavelengths to increase a wavelength spacing. See FIG. 5 for example.

Another such additional feature is the adapting comprising the step of reconfiguring the optical sections to add one or more optical regenerators so as to split one or more of the optical sections. This is another source of bit errors but this remedy uses more hardware and so adds capital costs. See FIG. 5 for example.

Another such additional feature is the adapting comprising the step of selecting a different route for at least one of the optical sections. This is another way of reducing cumulative bit errors, if the alternative route has more optical sections but each one being shorter for example. See FIG. 5 for example.

Another such additional feature is the step of adapting comprising adapting (an optical transmitter for the respective optical section, to adapt any one or more of: modulation, optical power. This is another way to reduce bit errors, though it might have knock on effects on other wavelengths for example, or reduce capacity. See FIG. 5 for example.

Another aspect provides a computer program having instructions on a computer readable medium which when executed by a processor cause the processor to carry out the methods set out above.

Another aspect provides apparatus for monitoring a communications network of paths for sending packets, and having a packet error monitor configured to monitor packet errors in one of the paths having at least two optical sections coupled in series with a break in continuity of optical transmission monitoring between the optical sections. Optical section monitors are provided to monitor a transmission quality of each of these optical sections. A processor is provided configured to detect a state in which the monitored packet errors exceed an acceptable threshold, but at the same time the respective optical section transmission qualities monitored are acceptable, and for outputting a signal indicative of the detection of this state.

This can help resolve a potential conflict between packet and optical layers, when the packet layer sees errors but the optical layer is indicating the paths are OK. Since this involves information from both layers, in principle, the processor used for the detection could be that used for network management of either layer, or be a separate processor outside both layer management systems. See FIG. 1 for example.

Another such additional feature is the apparatus being configured to couple the signal to a path computation entity to request an alternative route for the packets. This is usually quicker and lower cost than optical layer adaptation, so is worth trying first.

Another such additional feature is the monitoring of transmission quality comprising monitoring bit errors.

Another such additional feature is the apparatus having an optical layer management processor, to cause adapting of at least one of these optical sections to reduce bit errors based on the signal.

Another aspect provides apparatus for adapting optical sections of a communications network of paths for sending packets, the apparatus having an input coupled to receive a signal relating to one of the paths having at least two optical sections coupled in series with a break in continuity of optical transmission monitoring between the optical sections. The signal indicates a detection of a state in which monitored packet errors exceed an acceptable threshold, but at the same time respective optical section transmission qualities monitored for the optical sections are acceptable. An optical layer management processor is provided for adapting of at least one of these optical sections to improve its transmission quality.

Another such additional feature is the optical layer management processor being configured to carry out the adapting by at least one of: altering a wavelength allocation to reduce cross talk with other optical paths, reconfiguring the optical sections to provide more optical regeneration so as to shorten at least some of the optical sections, selecting a different route for at least one of the optical sections, adapting a modulation of an optical transmitter for the respective optical path, and adapting an optical power of the optical transmitter. Another aspect provides a signal in a transmission medium having an indication of a detection of a state relating to a communications network having paths for packets, in which state, for one of the paths having at least two optical sections coupled in series with a break in continuity of optical transmission monitoring between the optical sections, monitored packet errors exceed an acceptable threshold, but at the same time respective optical section transmission qualities monitored for these optical sections are acceptable.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
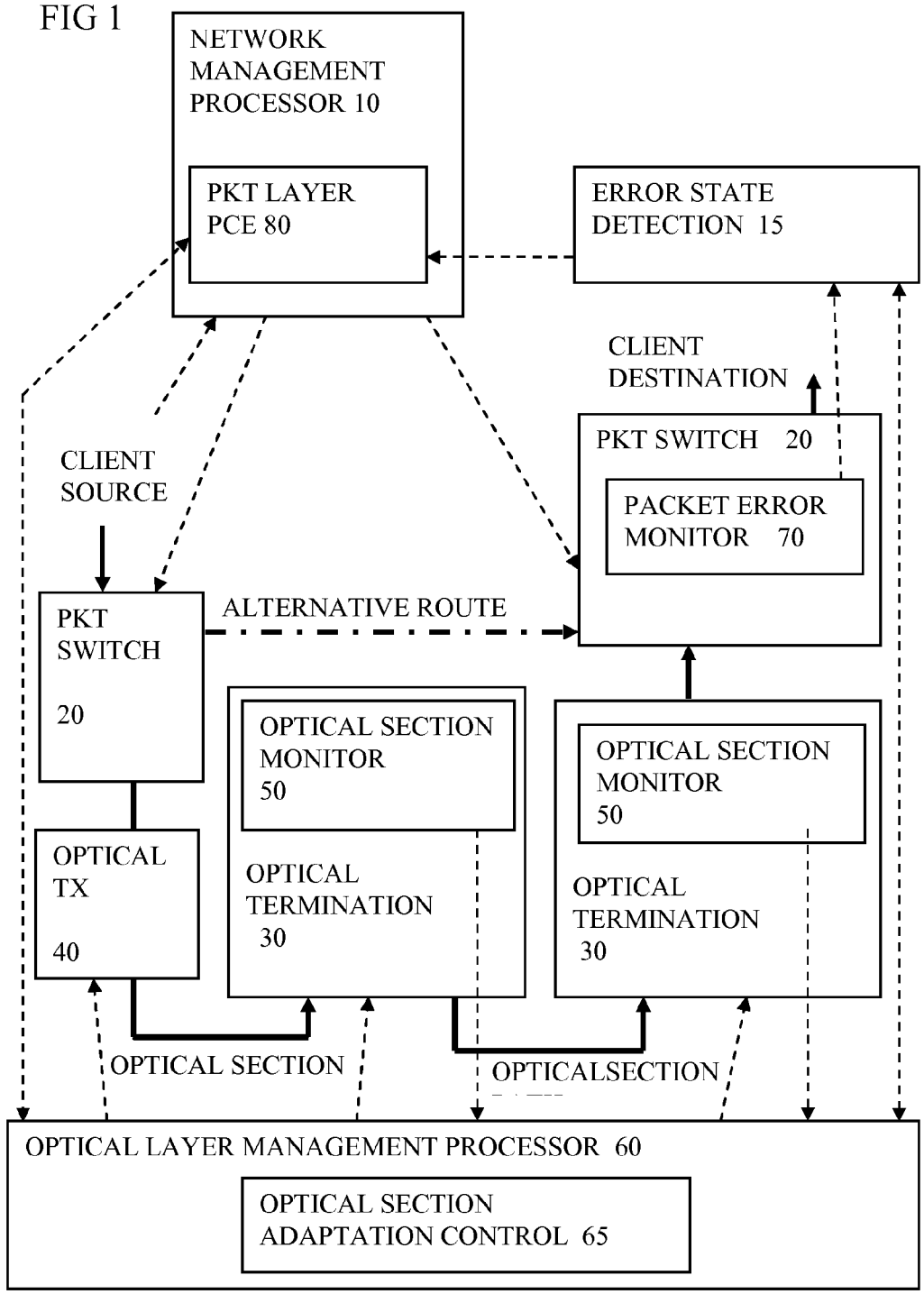
FIG. 1 shows a schematic view of parts of a network according to a first embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

ABBREVIATIONS

BER Bit Error Rate
E2E End to End
E-NNI External Network-Network Interface
GMPLS Generalized Multi Protocol Label Switching
MTU Maximum Transmission Unit
PER Packet Error Rate
PM Packet Monitoring
POTP Packet Optical Transport Platform
ROADM Reconfigurable Optical Add Drop Multiplexer
TMF Tele-Management Forum
UNI User Network Interface
WSON Wavelength Switched Optical Network

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described apparatus, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to optical transmission monitoring are intended to encompass any monitoring at the optical layer such as bit error rate detection, optical quality measurements such as optical SNR, eye measurement, Q factor and so on, but not to encompass packet error rate monitoring.

References to a break in continuity of optical transmission monitoring are intended to encompass optical to electrical conversion which would break continuity of optical quality measurements, and analog to digital conversion which would enable break in continuity of bit error rate, and in some cases 2R or 3R regeneration which could break continuity of optical quality measurements at least, though not necessarily break continuity of BER monitoring for example.

Introduction

By way of introduction to the embodiments, how they address some issues with conventional designs will be explained. In a network where packet client traffic traverses an optical layer and where there is no E2E OTN continuity from the source to the destination of the packet traffic, it could happen that the packet flow experiences an excess of packet loss even if all sections of the optical layer are fully working with the planned performance. How can this happen?

Packet operations verify an excessive Packet Error Rate (PER), but it's not clear where this happened or why, because the underlying optical layer might be composed by multiple optical paths, each of which with an acceptable Bit Error Rate (BER) but whose aggregate BER is causing a non-acceptable PER, as will be explained in more detail below.

This situation prevents packet layer from taking actions to proactively mitigate the PER (for example re-routing on an alternative optical path), and complicates life for operations personnel tasked with meeting Service Level Agreements (SLA).

Too high a BER may indicate that a slower data packet rate would actually improve overall transmission time for a given amount of transmitted data since the BER might be reduced, lowering the number of packets that had to be resent.

These two parameters PER and BER are related, also even when intermediate layers are present in between. The impact of bit errors (which happens in the lower layer) on the upper packet layer, depends on various factors. In one example there is an intermediate layer 2 protocol, such as Ethernet, in between. The Maximum Transmission Unit (MTU) of a layer/protocol is the size, in bytes, of the largest protocol data unit that the layer can pass onwards. If Ethernet is used as layer 2 bearer, MTU=1500 bytes=1.2E4 bits.

If it is assumed that every bit with an error at the lower layer represents at least a byte of data that is damaged in the packet layer above, then the conversion from BER to PER is simple. The PER can be assumed to be equivalent to the multiplication of BER by MTU. In a more complex network scenario, where also MPLS is involved, dependence of PER from BER can vary also as a function of number of traversed nodes.

Figure 4:
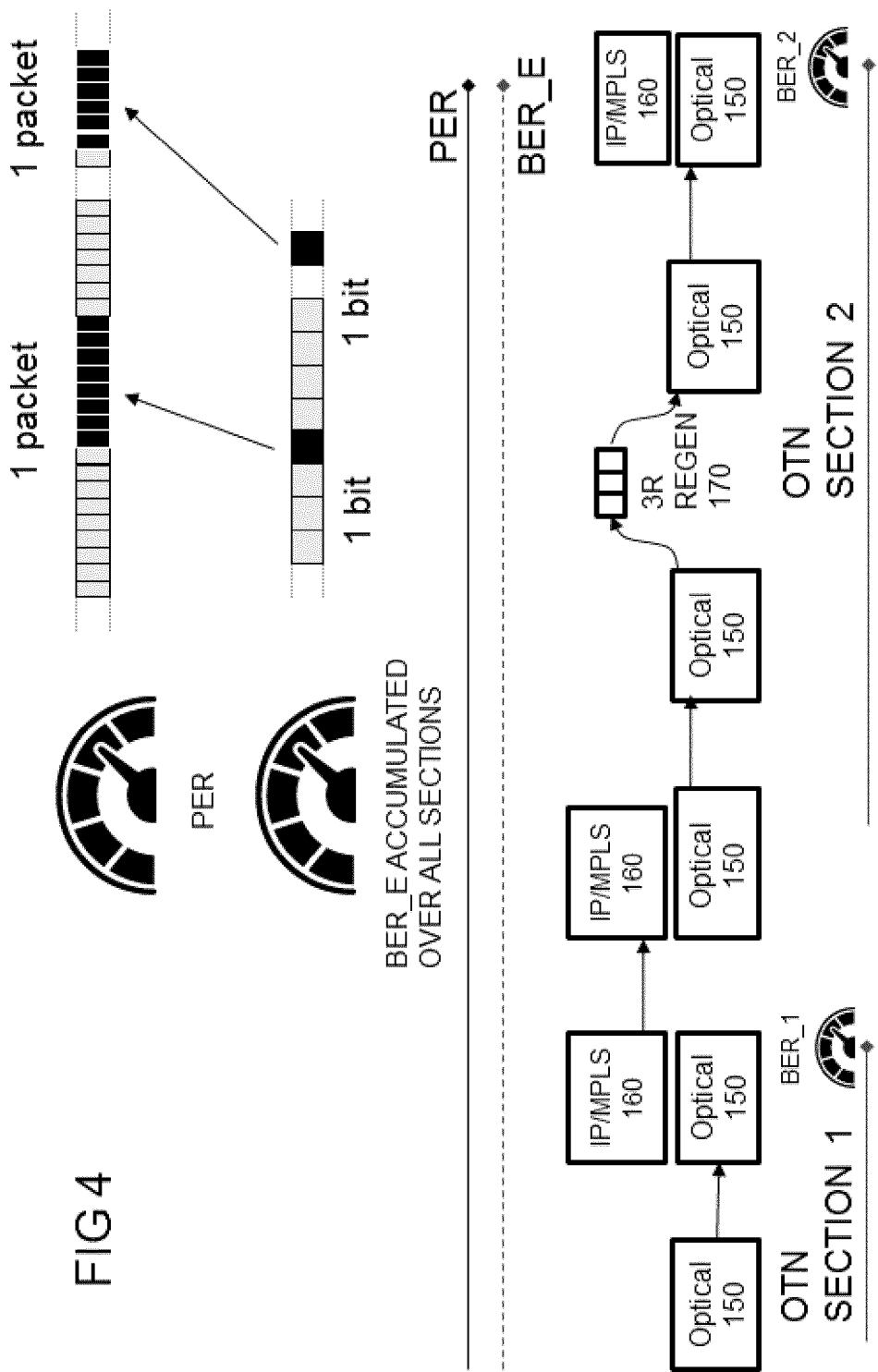
FIG. 4 shows a representation of parts of a network to show PER and BER for a series of optical sections.

FIG. 4, PER and BER for a Series of Optical Sections

As shown for example in FIG. 4, consider two contiguous optical sections separated by an electrical switching point, for example at MPLS level. Six nodes are shown. A first optical (e.g. OTN) section has optical layer components 150. At the second node, at the end of the first optical section the path has an optical to electrical conversion to reach a packet part, such as an IP/MPLS part 160. A packet section leads to a third node where there is an electrical to optical conversion from IP/MPLS part 160 to optical layer component 150. This starts a second optical section. At the end of the first of these sections a BER_1 is obtained. At the end of the second section a BER_2 is obtained. The second section has similar components and also has a 3R regenerator 170. In case of OTN framing in the two optical sections, the acceptable performances are expressed in the G.8201 recommendation.

If both BER_1 and BER_2 are under a predefined acceptance threshold then the two sections are considered "feasible" and thus eligible to be used for traffic. This is usually reported to a management system to enable it to route new traffic requests.

Even if both the optical sections are feasible, traffic crossing the sections in sequence will experience one wrong bit every 1/BER_1 (in average) at the end of the first section and an additional wrong bit every 1/BER_2 (in average) after the second section. In practical the effective BER as seen by a signal crossing both the sections is the accumulated BER, shown as BER_E>BER_1+BER_2. In the known case that the overall path has an OTN framing which is maintained from end to end, then the BER_E is the BER of the E2E path as defined in the G.8201 recommendation. In this case, an excess of BER_E automatically triggers a restoration at the optical layer and no action is needed at the packet layer. In this context the present method is not needed as the end to end BER is monitored and OTN restoration can take place.

However there are network contexts, like the one depicted in FIG. 4, in which the packet traffic does not cross OTN at all or, more likely, there is no OTN continuity along the packet route. A typical example is a network where there are IP/MPLS over DWDM nodes where in each or in some, nodes an electrical switching is done at the MPLS level and so the OTN BER monitoring is terminated and so is not carried out end to end. This means there can be a state in which the optical sections can be acceptable but the accumulation of bit errors over the entire path is not acceptable. But up to now this state is not detectable.

In this case, even if the packet traffic crosses OTN trunks (or even non-OTN segments) and each OTN trunk has an E2E BER under threshold, the IP/MPLS traffic cannot locate where is the cause of packet loss, if any, because it sees that each OTN trunk fits the G.8201 required performances. In this case the IP/MPLS can just recover in total diversity, with respect to the primary path, with a waste of bandwidth. In fact a recovery performed at the "upper layer" allows avoiding traffic losses but does not solve the problem of bandwidth wasting, in the sense that the lambda/lambdas that was/were allocated for carrying such MPLS or OTN traffic are kept in place but are not (and will not) be used any longer, not to revert to the condition of PER under threshold.

Consider now a practical WSON implementation where a client packet signal, flowing from an ingress node towards an egress node, can cross two or more optical sections separated by two or more nodes having electrical switching, e.g. at MPLS level, and with no OTN continuity along the path, as in FIG. 4. The real number of wrong bits, and thus of affected packets, accumulates as explained before. This happens even if each optical section, considered as a separate entity, is assumed to be feasible and eligible to carry traffic.

Optical Layer Implemented as WSON

A Wavelength Switched Optical Network (WSON) supports end-to-end optical paths, called lightpaths, between nodes requiring connection in the network. Intermediate nodes in this type of network support wavelength switching and may also support wavelength conversion. In contrast with point-to-point optical communication links which provide high-capacity transport, always between the same pair of nodes, a WSON supports the setting up and tearing down of lightpaths between pairs of nodes of a network having a more complex topology, such as a ring, interconnected rings or mesh topology. A Routing and Wavelength Assignment (RWA) function is typically carried out by a path computation element PCE of the WSON and involves routing a lightpath across the WSON and assigning a wavelength to the lightpath.

WSON can have a GMPLS based control plane and a PCE applied to an "all optical" network, or to the optical layer of a multi-layer network. Multi-degree ROADMs are provided able to switch (for recovery purposes) in few minutes on alternative paths defined in a planning phase. Alternative paths can be Pre-Planned (PP) or On-The-Fly (OTF).

Accumulated BER_E Over Threshold

There are two possible scenarios in which a BER_E over threshold can be harmful:

1. The amount of lost packets is not acceptable but Hello packets are not lost: this means that the packet layer has no means to detect a degrade, everything looks fine and the control plane/management system does not perform any recovery attempt 2. A Packet Monitoring (PM) system detects an excessive PER. Verifying the underlying optical layer; all the involved optical sections have a BER under threshold. Packet operations know that packet loss has occurred, but it's not clear where this happened or why, because it was due to an excess of BER in the overall optical path even if each transparent section of the path itself has an acceptable BER value. This situation prevents the packet layer from taking actions to proactively mitigate the PER (for example rerouting on an alternative optical path), and complicates life for operations personnel tasked with meeting SLAs.

It worth noting that, in a MPLS context, packet loss can have an indirect detrimental effect on packet loss. The MPLS header does not have an error detection field and its errors do not result in a packet loss decision in the MPLS nodes, but might result in wrong routing (if the header has errors in the label field) or header misunderstanding (if the errors occur in the other MPLS header fields). Through these effects we consider that all errors in MPLS header cause respective packet loss.

FIG. 1, a First Embodiment

Embodiments can be applied to a variety of packet over optical scenarios. A method is proposed to mitigate the effect of cumulative bit errors on packet errors. The effect can arise when a packet traffic traverses multiple optical sections, separated by nodes performing electrical switching (e.g. at MPLS level), even if each optical section has an acceptable E2E BER (as explained in more detail below).

The proposed method can be applied in some examples to augment the interaction between packet layers, such as IP/MPLS layers and optical layers such as DWDM/WSON layers for any type of traffic, and particularly for traffic for a client/server relationship.

FIG. 1 shows parts of a network including three nodes, and there can be many more, not shown. A first node receives the traffic from a client source and has a packet switch 20, which is coupled to an optical transmitter 40. A first optical section of the path can be implemented by as an optical fiber for example to couple this node to a second node which has an optical termination 30. An optical section monitor 50 can be implemented by a digital circuit for detecting bit errors for example. A second optical section is formed from this node to a third node which is a destination node and also has an optical termination 30 and an optical section monitor 50. At this destination node, there is conversion to electrical domain, and a packet switch 20 which passes the data to the client destination. A packet error monitor can be implemented here.

There is an optical layer management processor 60 provided for receiving the results of optical section monitors and for adapting the optical components if needed, using an optical section adaptation control part 65. These parts can have their functions distributed across the nodes. An error state detection part 15 is provided for detecting the state described above that the packet errors are not acceptable, yet each of the optical sections is individually showing acceptable transmission quality. This part is coupled to receive the optical section quality indications, in this case via the optical layer management processor. The error state detection part is also coupled to receive the packet error monitoring results, in this case via the packet switch, although other arrangements can be envisaged. The detection part can be coupled to a network management processor 10 which has a packet layer PCE part 80, at least for examples where the output detection signal is used to cause a request for an alternative route. An example of an alternative route at the packet level is shown by the dot-dash line between the packet switches 20 at the source and destination. In some cases the detection signal can be output to the optical section adaptation control part 65.

There is shown a connection such as a signaling path between the packet layer PCE 80 and the optical layer management processor 60. This can enable the path selected by the PCE to be set up by the optical layer management processor, and can enable the optical layer management processor to respond and keep the PCE updated with status and available capacity information for example. Such communications can be implemented using the known TMF standard (Tele-Management Forum) for integrated end-to-end management and provisioning of multi-vendor networks. The TMF Standard facilitates this by enabling a NMS to create and manage end to end connections and devices across TMF compliant Network Elements. This communications channel can also be used to pass the packet error rate information and the optical section quality measurements to the error state detector, wherever that detector is located. It can also be used to transmit the signal indicative of the detected state.

An alternative embodiment could be envisaged having the functions of parts 60, 65 and 80, and optionally part 15, integrated in a multi-layer management part, which itself could be centralized or distributed, and could avoid the need for management communication between the different management entities for the different layers.

Figure 2:
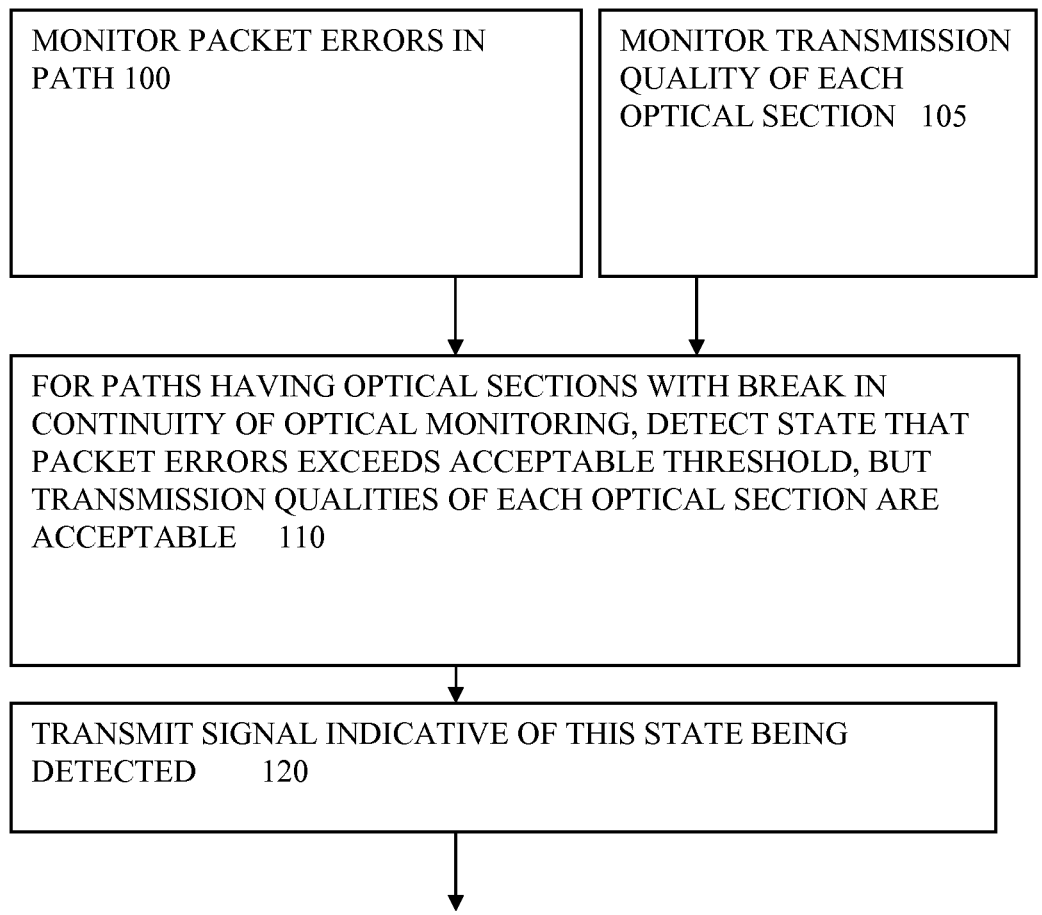
FIG. 2 shows steps according to an embodiment.

FIG. 2, Monitoring Steps According to an Embodiment

FIG. 2 shows some steps for operation of an embodiment as shown in FIG. 1 or other embodiments for monitoring a communications network having paths for sending packets. Step 100 involves monitoring packet errors in one of the paths having at least two optical sections coupled in series with a break in continuity of optical transmission monitoring between the optical sections. Step 105 in parallel involves monitoring a transmission quality of each of these optical sections. At step 110 a state is detected in which the monitored packet errors do exceed an acceptable threshold, but at the same time the transmission quality of each of the optical sections does not exceed an acceptable threshold. At step 120 there is a step of transmitting a signal indicative of the detection of this state. Such detection of this state can be important for various reasons, and can be useful to indicate to an operator, or to a client, or to enable various remedial actions while reducing the risk of a potential conflict between packet and optical layers. Various ways of implementing these steps can be envisaged.

Figure 3:
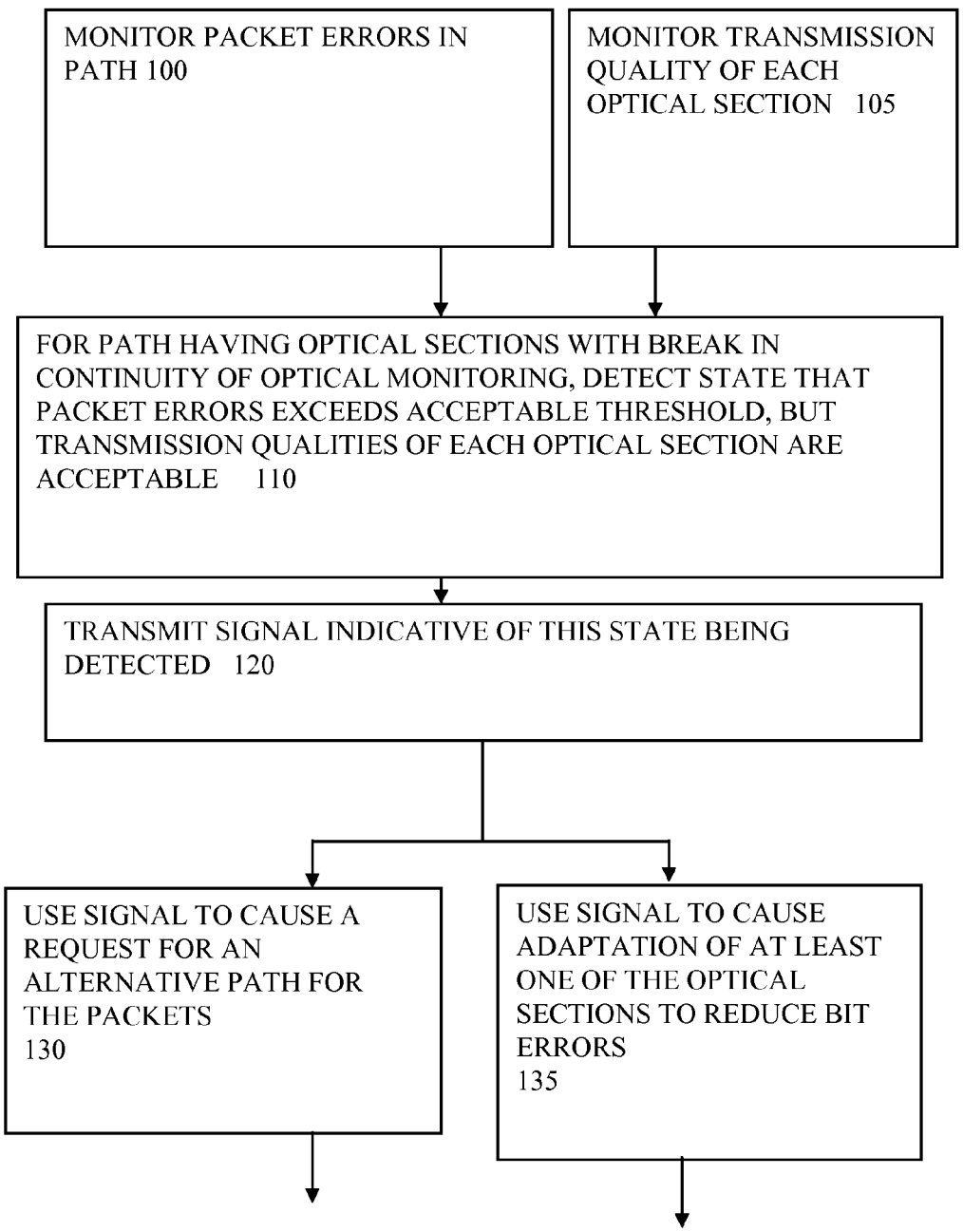
FIG. 3 shows steps according to another embodiment.

FIG. 3, Monitoring Steps According to Another Embodiment

FIG. 3 shows another embodiment, showing some steps for operation of an embodiment as shown in FIG. 1 or other embodiments for monitoring a communications network having paths for sending packets. As in FIG. 2, step 100 involves monitoring packet errors in one of the paths having at least two optical sections coupled in series with a break in continuity of optical transmission monitoring between the optical sections. Step 105 in parallel involves monitoring a transmission quality of each of these optical sections. Again at step 110 a state is detected in which the monitored packet errors do exceed an acceptable threshold, but at the same time the transmission quality of each of the optical sections does not exceed an acceptable threshold. At step 120 there is a step of transmitting a signal indicative of the detection of this state, and this can be used at step 130 to cause a request for an alternative path for the packets. Alternatively or as well there is a step 135 of using the signal to cause an adaptation of at least one of the optical sections to improve transmission quality to reduce bit errors. This can be carried out in parallel with step 130 or only after step 130 has been tried.

Figure 5:
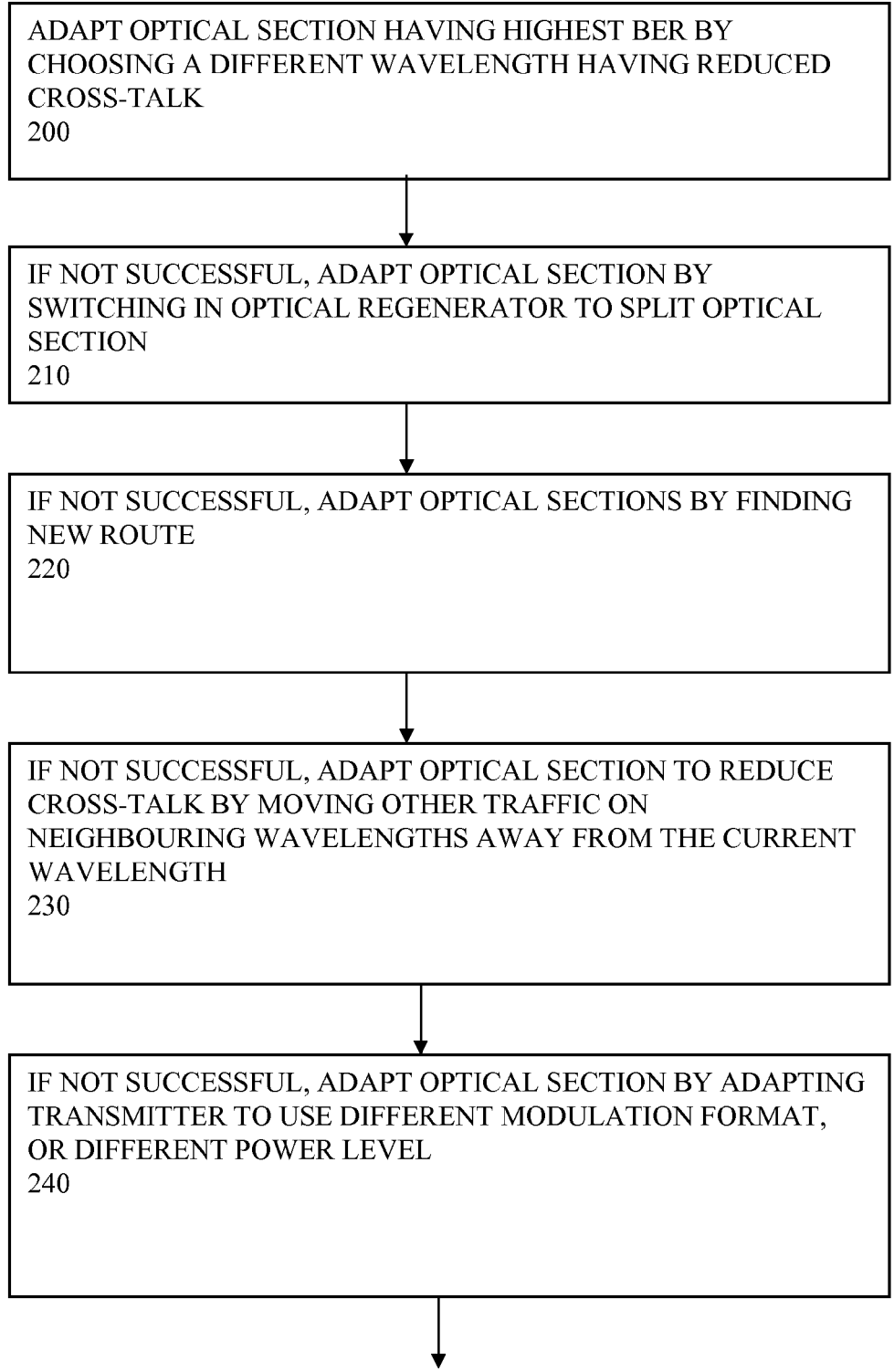
FIG. 5 shows steps in adapting an optical section according to the detected state according to another embodiment.

FIG. 5, Adaptation Steps According to Another Embodiment

FIG. 5 shows various possible steps to implement the step 135 of adapting the optical section, as shown in FIG. 3. Although shown in sequence, they can be implemented in any other order, or in parallel, or any selection of one or more of them can be implemented. At step 200 there is a step of adapting the section by choosing a different wavelength to allocate to that path, to find a wavelength having less cross talk for example. The optical section being adapted in this step or in the other steps can be chosen as the optical section having the highest BER, or the section which is easiest or least costly to change for any reason. Step 210 shows the step of adapting by switching in one or more optical regenerators to split the optical section into two or more lengths. This can be implemented by a "pit stop" method shown in G. Bottari et al.—"OTN Pit-Stop in Wavelength Switched Optical Networks", proceedings of OFC 2012 or other methods. In this technique the network is provided with regeneration nodes each having a ROADM having drop paths and add paths. An electrical switch in these nodes provides configurable regeneration capacity by coupling selected drop paths to selected add paths. Some of the configurable regeneration capacity is kept for unplanned restoration paths. An optical layer PCE determines routing and bandwidth assignments for an unplanned restoration path for the traffic flow to avoid a fault, and sends configuration messages to the nodes to set up the unplanned restoration path dynamically and to configure the electrical switch to provide regeneration on the path. Keeping some reconfigurable regeneration capacity enables much longer unplanned paths to be found to avoid faults, and enables wavelength conversion if needed. Thus the reliability of finding at least one path avoiding the fault can be increased. This can be a relatively fast adaptation making use of local optical switches and may reduce the need to wait for a settling time compared to other adaptation steps.

At step 220 there is a step of adapting optical sections by finding a new route. This may involve a route passing through different optical switches or different fibers or other components to the destination. At step 230 there is a step of adapting the optical section by moving other traffic on other paths on neighboring wavelengths, to move them away from the current wavelength to reduce cross talk. Another possibility is step 240 involving adapting an optical transmitter to use a different modulation format, or a different power level for example.

Figure 6:
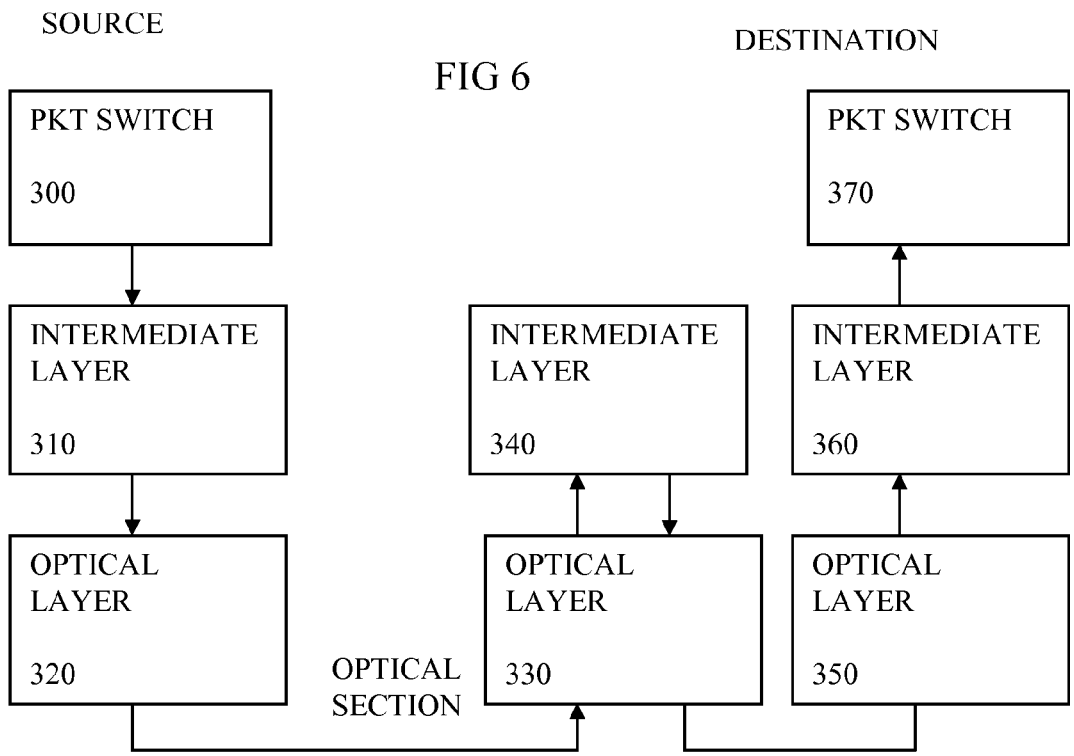
FIGS. 6, 7 and 8 show schematic views of parts of networks according to other embodiments.

FIG. 6, Embodiment with Multiple Layers

FIG. 6 shows an embodiment with an intermediate layer at each node, to show that it is not limited to the direct packet over optical scenario. The source node has a packet switch 300 (for example an IP switch) which feeds the traffic to an optical layer 320 via an intermediate layer 310 (for example an MPLS layer). There is an intermediate node having an intermediate layer 340 and an optical layer 330 layer. This breaks the continuity of the optical transmission monitoring. A second optical section is provided to the destination node which has an optical layer 350, an intermediate layer 360, and a packet switch 370.

Embodiments Having Different Boundaries

Two of many different scenarios are as follows:
a) Boundary between packet layer and optical layer is a (e.g. packet-optical) node.
b) Boundary between packet layer and optical layer is a link.

These two cases are detailed in the following sections.
Boundary Node

Two packet networks are connected via an optical network using a couple of packet-optical nodes, one per side, to feed packet traffic on the wavelengths. This is the arrangement of FIG. 1 for example. The method can operate according to the following steps corresponding to those shown in FIGS. 3 and 5 for example:

1. The packet network detecting PER over threshold (either being the boundary node or one of the other nodes and informing the boundary node)
2. The boundary node packet layer sending a command to the optical layer asking for a consequent action due to PER over threshold (note: optionally may be only after trying a packet level rerouting)
3. The optical layer of the boundary node performing the following actions depending on the case:
   If the actual path is the shortest one perform an action aimed at improving the BER (e.g. 3R regeneration on one or more nodes in addition to the ones, if any, already performed), if spare regeneration groups are available on the nodes along the path. To perform this action the above described "pit-stop" technique as shown in G. Bottari et al.—"OTN Pit-Stop in Wavelength Switched Optical Networks", proceedings of OFC 2012, could be used.
   If the actual path is the shortest one and no regeneration group is available try to restore along a path that is not the shortest but could be composed by a higher number of transparent sections with lower resulting BER_E.

If the actual path is not the shortest one (i.e. a failure occurred and this is a restoration path) try to move back to the nominal path or perform a re-optimization looking for a path that is not the best one but better than the current one.

4. The optical layer management performing the signaling of the new path, if found, and returning an acknowledgement command to the packet layer or returning an error command to the packet layer if no path with better BER_E is found.

5. The optical layer periodically re-iterating the procedure until a new path is found.

Figure 7:
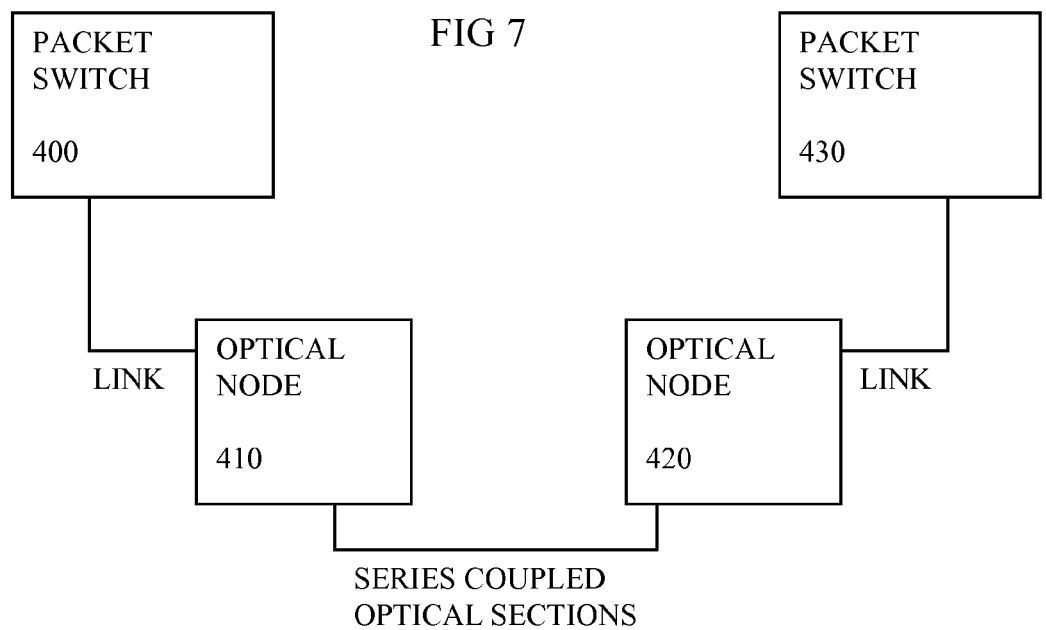

FIG. 7, Boundary Link Example

Two packet networks are connected via an optical network using a couple of links, one per side, as boundaries. This is the typical situation of a router having colored interfaces on board or of a ROADM receiving packet traffic (e.g. transported as Gigabit Ethernet payload) on the client side of a transponder.

With respect to the previous case with a boundary node, there are no longer commands between different layers of the same node but instead there are messages between different nodes sent via a signaling protocol over an overlay interface (e.g. implemented using known protocols such as UNI, E-NNI). FIG. 7 shows a schematic view of an example having a packet switch 400 at a source side, coupled to an optical node 410 by a boundary link. This optical node is coupled by two or more series coupled optical sections to a destination end optical node 420. This is coupled by a link to the destination end packet switch 430.

The method operates according to the following steps, using monitoring and adaptation corresponding to that shown in FIGS. 3 and 5 for example:

1. The packet network detecting PER over threshold (either being the node on the overlay interface or one of the other nodes) and informing the node on the overlay interface.
2. The packet node on the overlay interface sending a signaling message to the ingress node of the optical layer asking for a consequent action due to PER over threshold (note: optionally may be only after trying a packet level rerouting)
3. The optical ingress node performing the following actions depending on the case as follows:
    If the actual path is the shortest one, perform 3R regeneration on one or more nodes (in addition to the ones, if any, already performed), if spare regenerations groups are available on the nodes along the path
    If the actual path is the shortest one and no 3G regenerators are available, try to restore along a path that is not the shortest but could be composed of a higher number of transparent sections to give a lower BER_E
    If the actual path is not the shortest one (i.e. a failure occurred and this is a restoration path) try to move back to the nominal path or perform a re-optimization looking for a path that is not the best one but better than the current one.
4. The optical ingress node also performs the signaling of the new path, if found, and returning an acknowledgement message to the packet node on the overlay interface. The optical ingress node returns an error message to the packet node on the overlay interface if no path with better BER_E is found 5. The optical ingress node periodically re-iterates the procedure until a new path is found.

Figure 8:
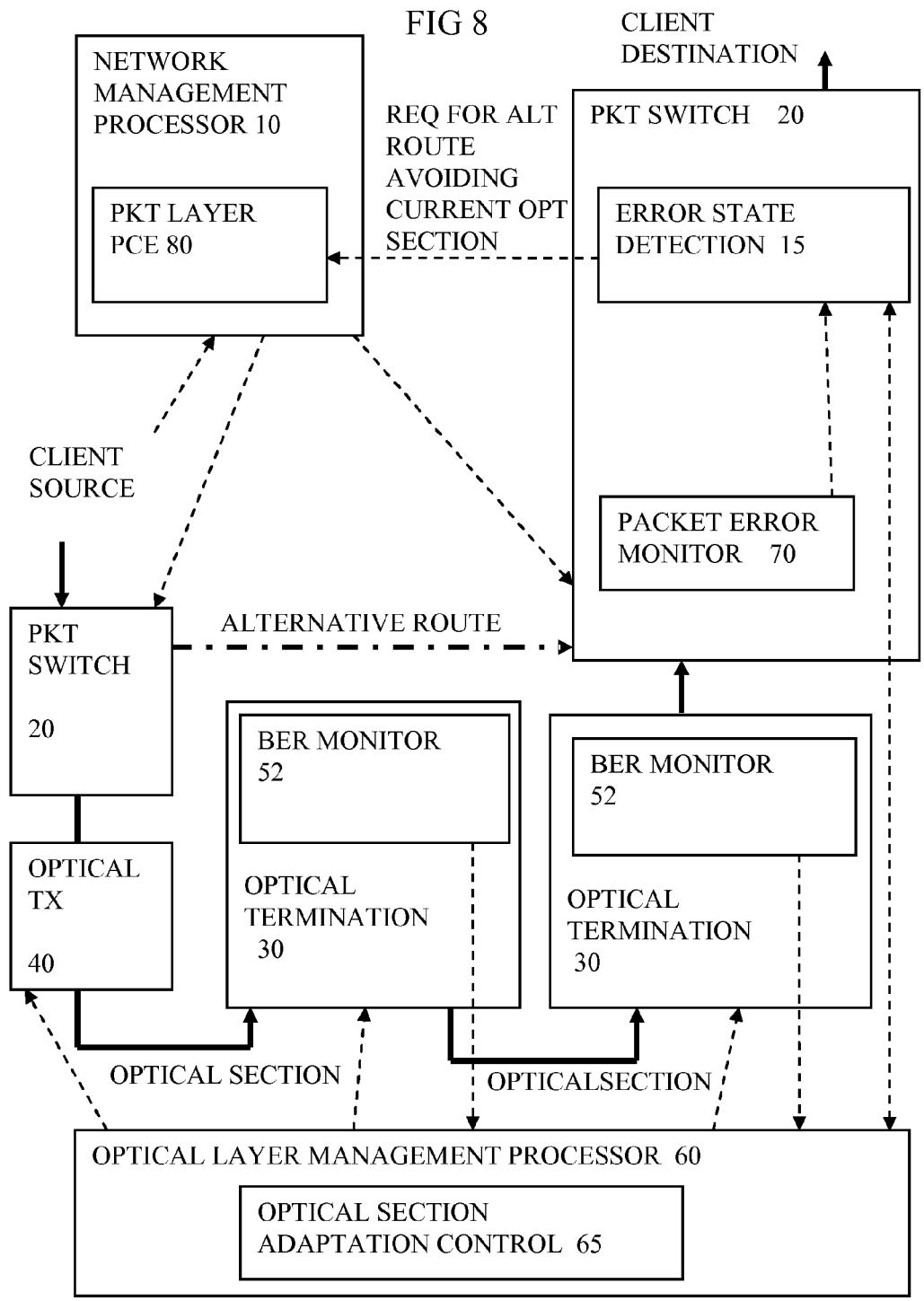

FIG. 8, Embodiment with Error State Detection at Destination

FIG. 8 shows a schematic view of parts of a network similar to that of FIG. 1 but in this case having the error state detection incorporated with the packet switch at the destination node. Another option is to have the error state detection in a centralized location such as with the network management functions. In principle it could be incorporated in the optical layer management at the destination node, or elsewhere. In this embodiment the optical section monitoring is implemented as BER monitors 52.

CONCLUDING REMARKS

As has been described above, a communications network has monitoring of packet errors in one of the paths having at least two optical sections coupled in series with a break in continuity of optical transmission monitoring between the optical sections, and monitoring of a transmission quality of each of these optical sections. A state is detected in which the monitored packet errors do exceed an acceptable threshold, but at the same time the transmission quality of each of the optical sections is acceptable, and an indication is transmitted of the detection. This can cause a request for an alternative path for the packets, or cause adapting of these optical sections to reduce bit errors. This can enable handling of potential conflict between packet and optical layers, when the packet layer sees errors but the optical layer indicates no problem.

The features described can help address the issue of high Packet Error Rate in IP over DWDM/WSON environments due to concatenation of multiple optical sections separated by switching at the electrical layer or any other optical termination which loses the continuity of optical transmission monitoring. Embodiments can be relatively simple and widely applicable as they do not need to impact conventional control plane architectures and recovery schemes, and can be implemented by just augment the interaction between different control plane instances running at the different layers.

Embodiments can simplify the network management operations in the research of the causes of the excessive PER and can help avoid blind rerouting attempts in the packet layer due to the BER experienced at the photonic layer.

Moreover the method is versatile as it can apply both to POTPs and to overlay solutions with router and ROADM on different NEs (e.g. a packet switch or POTP).

The invention claimed is:

1. A method of monitoring a communications network having paths for sending packets, the method comprising:
    monitoring packet errors in one of the paths having at least two optical sections coupled in series with a break in continuity of optical transmission monitoring between the optical sections, and monitoring a transmission quality of each of these optical sections;
    detecting a state in which the monitored packet errors do exceed an acceptable threshold, but at the same time the transmission quality of each of the optical sections is acceptable; and
    transmitting a signal indicative of the detection of this state.

2. The method of claim 1, wherein the signal is used to cause a request for an alternative path for the packets.

3. The method of claim 2, the step of requesting comprises indicating that the alternative path is to use different optical sections.

4. The method of claim 1 wherein the monitoring of transmission quality comprises monitoring bit errors.

5. The method of claim 1 wherein the signal is used for the step of causing adapting of at least one of these optical sections to reduce bit errors.

6. The method of claim 5, wherein the adapting comprises altering a wavelength allocation of an optical path to reduce cross talk with optical paths having adjacent wavelengths.

7. The method of claim 5, the adapting comprising the step of reconfiguring the optical sections to add one or more optical regenerators so as to split one or more of the optical sections.

8. The method of claim 5, the adapting comprising the step of selecting a different route for at least one of the optical sections.

9. The method of claim 5, the step of adapting comprising adapting an optical transmitter for the respective optical section, to adapt any one or more of: modulation, optical power.

10. A method of adapting optical sections of a communications network of paths for sending packets, the method comprising:
receiving a signal relating to one of the paths having at least two of the optical sections coupled in series with a break in continuity of optical transmission monitoring between the optical sections, the signal being indicative of a detection of a state in which monitored packet errors exceed an acceptable threshold, but at the same time respective optical section transmission qualities monitored for the optical sections are acceptable; and
adapting at least one of these optical sections to improve its transmission quality,
wherein the adapting comprises one or more of:
altering a wavelength allocation of an optical path to reduce cross talk with optical paths having adjacent wavelengths;
reconfiguring the optical sections to add one or more optical regenerators so as to split one or more of the optical sections;
selecting a different route for at least one of the optical sections; and
adapting an optical transmitter for the respective optical section, to adapt any one or more of: modulation, optical power.

11. A nontransitory computer readable medium comprising instructions which when executed by a processor cause the processor to carry out a method of monitoring a communications network having paths for sending packets, the method comprising:
monitoring packet errors in one of the paths having at least two optical sections coupled in series with a break in continuity of optical transmission monitoring between the optical sections, and monitoring a transmission quality of each of these optical sections;
detecting a state in which the monitored packet errors do exceed an acceptable threshold, but at the same time the transmission quality of each of the optical sections is acceptable; and
transmitting a signal indicative of the detection of this state.

12. An apparatus for monitoring a communications network of paths for sending packets, the apparatus having
a packet error monitor configured to monitor packet errors in one of the paths having at least two optical sections coupled in series with a break in continuity of optical transmission monitoring between the optical sections;
optical section monitors configured to monitor a transmission quality of each of these optical sections; and
a processor configured to detect a state in which the monitored packet errors exceed an acceptable threshold, but at the same time the respective optical section transmission qualities monitored are acceptable, and for outputting a signal indicative of the detection of this state.

13. The apparatus of claim 12, the apparatus being configured to couple the signal to a path computation entity to request an alternative route for the packets.

14. The apparatus of claim 12, wherein the monitoring of transmission quality comprises monitoring bit errors.

15. The apparatus of claim 12 being configured to couple the signal to an optical layer management processor, to cause adapting of at least one of these optical sections to reduce bit errors.

16. An apparatus for adapting optical sections of a communications network of paths for sending packets, the apparatus having:
an input coupled to receive a signal relating to one of the paths having at least two optical sections coupled in series with a break in continuity of optical transmission monitoring between the optical sections, the signal being indicative of a detection of a state in which monitored packet errors exceed an acceptable threshold, but at the same time respective optical section transmission qualities monitored for the optical sections are acceptable; and
an optical layer management processor for adapting of at least one of these optical sections to improve its transmission quality.

17. The apparatus of claim 16, the optical layer management processor being configured to carry out the adapting by at least one of: altering a wavelength allocation to reduce cross talk with other optical paths, reconfiguring the optical sections to add an optical regenerator so as to split at least one of the optical sections, selecting a different route for at least one of the optical sections, adapting a modulation of an optical transmitter for the respective optical path, and adapting an optical power of the optical transmitter.

* * * * *